(12) United States Patent
Li et al.

(10) Patent No.: US 11,657,573 B2
(45) Date of Patent: May 23, 2023

(54) AUTOMATIC MESH TRACKING FOR 3D FACE MODELING

(71) Applicants: SONY GROUP CORPORATION, Tokyo (JP); Sony Corporation of America, New York, NY (US)

(72) Inventors: Yuelong Li, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 76 days.

(21) Appl. No.: 17/313,949

(22) Filed: May 6, 2021

(65) Prior Publication Data

US 2022/0358722 A1 Nov. 10, 2022

(51) Int. Cl.
| | |
|---|---|
| G06T 17/20 | (2006.01) |
| G06T 7/564 | (2017.01) |
| G06T 7/11 | (2017.01) |
| G06T 7/73 | (2017.01) |
| G06T 7/33 | (2017.01) |
| G06V 10/25 | (2022.01) |

(Continued)

(52) U.S. Cl.
CPC ............. *G06T 17/205* (2013.01); *G06N 3/04* (2013.01); *G06T 7/11* (2017.01); *G06T 7/337* (2017.01); *G06T 7/564* (2017.01); *G06T 7/75* (2017.01); *G06V 10/25* (2022.01); *G06V 10/44* (2022.01); *G06T 2207/20084* (2013.01)

(58) Field of Classification Search
CPC ........... G06T 7/564; G06T 7/11; G06T 7/337; G06T 7/70; G06T 7/73; G06T 7/74; G06T 7/75; G06V 10/44; G06V 30/1801; G06V 30/182; G06V 30/1823; G06V 30/1826; G06V 30/1829; G06V 30/1831; G06V 30/1834; G06V 30/1837

See application file for complete search history.

(56) References Cited

U.S. PATENT DOCUMENTS

| | | | |
|---|---|---|---|
| 2015/0123967 A1* | 5/2015 | Quinn | G06T 7/60 345/419 |
| 2016/0042548 A1 | 2/2016 | Du et al. | |

(Continued)

FOREIGN PATENT DOCUMENTS

CN 109903313 A 6/2019

OTHER PUBLICATIONS

Maalin et al., "Beyond BMI for self-estimates of body size and shape: A new method for developing stimuli correctly calibrated for body composition", Behavior Research Methods, https://doi.org/10.3758/s13428-020-01494-1, Sep. 2020 (Year: 2020).*

(Continued)

*Primary Examiner* — Diane M Wills
(74) *Attorney, Agent, or Firm* — Haverstock & Owens, A Law Corporation

(57) ABSTRACT

The mesh tracking described herein involves mesh tracking on 3D face models. In contrast to existing mesh tracking algorithms which generally require user intervention and manipulation, the mesh tracking algorithm is fully automatic once a template mesh is provided. In addition, an eye and mouth boundary detection algorithm is able to better reconstruct the shape of eyes and mouths.

39 Claims, 9 Drawing Sheets

(51) Int. Cl.
  *G06V 10/44* (2022.01)
  *G06N 3/04* (2023.01)

(56) References Cited

U.S. PATENT DOCUMENTS

2017/0024907 A1* 1/2017 Bermano ............... G06T 17/20
2017/0312064 A1* 11/2017 Jaisson ............... A61B 5/1079

OTHER PUBLICATIONS

Kehl, Wadim et al., "Real-Time 3D Model Tracking in Color and Depth on a Sigle CPU Core", arXiv:1911.10249v1[cs.CV]Nov. 22, 2019, pp. 1-12.
Walder Christian et al: "Markerless 3D Face Tracking", Sep. 9, 2009 (Sep. 9, 2009), SAT 2015 18th International Conference, Austin, TX, USA, Sep. 24-27, 2015; [Lecture Notes in Computer Science; Lect.Notes Computer], Springer, Berlin, Heidelberg, pp. 41-50. XP047380364, ISBN: 978-3-540-74549-5 abstract, sections 1-4, Figs. 1-3.
Krueger M et al: "Automatic and efficient 3D face feature segmentation with active contours", Image and Vision Computing New Zeland, 2009. IVCNZ'09. 24th International Conference, IEEE, Piscataway, NJ, USA, Nov. 23, 2009 (Nov. 23, 2009), pp. 165-170, XP031600035, ISBN: 978-1-4244-4697-1 abstract, sections I-VI, Figs. 1-14.
International Search Report with Written Opinion dated Oct. 25, 2022 issued in PCT Application No. PCT/IB2022/056161.

\* cited by examiner

AUTOMATIC MESH TRACKING FOR 3D FACE MODELING

FIELD OF THE INVENTION

The present invention relates to three dimensional graphics. More specifically, the present invention relates to mesh tracking.

BACKGROUND OF THE INVENTION

Mesh tracking aims at establishing vertex correspondences between meshes of different expressions. It is an important topic for blendshape creation and facial animation.

Previous approaches on mesh tracking are generally semi-automatic and largely rely on user manipulations. In addition, accurate estimation of eye and mouth contours remain an important yet largely open challenge.

SUMMARY OF THE INVENTION

The mesh tracking described herein involves mesh tracking on 3D face models. In contrast to existing mesh tracking algorithms which generally require user intervention and manipulation, the mesh tracking algorithm is fully automatic once a template mesh is provided. In addition, an eye and mouth boundary detection algorithm is able to better reconstruct the shape of eyes and mouths.

In one aspect, a method programmed in a non-transitory memory of a device comprises inputting unaligned 3D scans, implementing pose correction via rigid alignment on the unaligned 3D scans to generate aligned meshes, detecting eye and mouth boundaries on the aligned meshes, implementing dense mesh tracking on the aligned meshes and outputting a tracked mesh based on the dense mesh tracking. Implementing dense mesh tracking utilizes Wrap3. Rigid alignment is performed to remove head movement using coded targets. Detecting eye and mouth boundaries includes 3D contour detection. 3D detecting eye and mouth boundaries includes analyzing a view of a mesh to perform Region Of Interest (ROI) detection. 3D contour detection includes: applying mask Regional Convolutional Neural Network (RCNN) which results in a segmentation probability, left and right corners, and a region of interest, generating an edge map from the region of interest and using an improved active contour fitting snake algorithm. The snake algorithm involves minimizing $E_{snake}$ where $E_{snake}=E_{corner}+E_{edge}+E_{region}+E_{int}$. Implementing dense mesh tracking includes dividing a video into short clips to reduce drifting, performing forward and backward tracking within each clip, and merging the forward and backward clips together. The method further comprises eyelid correction through mesh deformation.

In another aspect, an apparatus comprises a non-transitory memory for storing an application, the application for: inputting unaligned 3D scans, implementing pose correction via rigid alignment on the unaligned 3D scans to generate aligned meshes, detecting eye and mouth boundaries on the aligned meshes, implementing dense mesh tracking on the aligned meshes and outputting a tracked mesh based on the dense mesh tracking and a processor coupled to the memory, the processor configured for processing the application. Implementing dense mesh tracking utilizes Wrap3. Rigid alignment is performed to remove head movement using coded targets. Detecting eye and mouth boundaries includes 3D contour detection. 3D detecting eye and mouth boundaries includes analyzing a view of a mesh to perform Region Of Interest (ROI) detection. 3D contour detection includes: applying mask Regional Convolutional Neural Network (RCNN) which results in a segmentation probability, left and right corners, and a region of interest, generating an edge map from the region of interest and using an improved active contour fitting snake algorithm. The snake algorithm involves minimizing $E_{snake}$ where $E_{snake}=E_{corner}+E_{edge}+E_{region}+E_{int}$. Implementing dense mesh tracking includes dividing a video into short clips to reduce drifting, performing forward and backward tracking within each clip, and merging the forward and backward clips together. The apparatus further comprises eyelid correction through mesh deformation.

In another aspect, a system comprises one or more cameras for acquiring three dimensional content and a device for processing the three dimensional content by: receiving three dimensional content including unaligned 3D scans, implementing pose correction via rigid alignment on the aligned 3D scans to generate aligned meshes, detecting eye and mouth boundaries on the aligned meshes, implementing dense mesh tracking on the aligned meshes and outputting a tracked mesh based on the dense mesh tracking. Implementing dense mesh tracking utilizes Wrap3. Rigid alignment is performed to remove head movement using coded targets. Detecting eye and mouth boundaries includes 3D contour detection. 3D detecting eye and mouth boundaries includes analyzing a view of a mesh to perform Region Of Interest (ROI) detection. 3D contour detection includes: applying mask Regional Convolutional Neural Network (RCNN) which results in a segmentation probability, left and right corners, and a region of interest, generating an edge map from the region of interest and using an improved active contour fitting snake algorithm. The snake algorithm involves minimizing $E_{snake}$ where $E_{snake}=E_{corner}+E_{edge}+E_{region}+E_{int}$. Implementing dense mesh tracking includes dividing a video into short clips to reduce drifting, performing forward and backward tracking within each clip, and merging the forward and backward clips together. The system further comprises eyelid correction through mesh deformation.

DETAILED DESCRIPTION OF THE PREFERRED EMBODIMENT

An automatic mesh tracking approach which frees artists from tedious editing tasks is described herein. The system includes an accurate boundary detection algorithm which automatically and faithfully captures eye and mouth boundary with different facial expressions.

The mesh tracking described herein includes mesh tracking on 3D face models, which establishes vertex correspondences between different expressions such as smiling, crying, laughing and others. This is an important issue in dynamic face modeling for blendshape generation and face rigging. In contrast to existing mesh tracking algorithms which generally require user intervention and manipulation, the mesh tracking algorithm is fully automatic once a template mesh is provided. In addition, an eye and mouth boundary detection algorithm is able to better reconstruct the shape of eyes and mouths.

Existing approaches typically detect eye/mouth boundaries semi-automatically, by requiring user input and propagating towards the whole video sequence. The mesh tracking described herein does not require such user manipulations thanks to a novel boundary detection approach.

The optical flow tracker is based on Wrap3, a mesh wrapping commercial software. Therefore, the algorithm is able to be implemented using a scripting language such as MATLAB or Python. For better performance, certain building blocks may be replaced by dedicated C/C++ modules.

The bidirectional optical flow tracker may be integrated into other mesh tracking systems. Detected eye and mouth boundaries provide constraints for eye and mouth modeling and animations.

Figure 1:
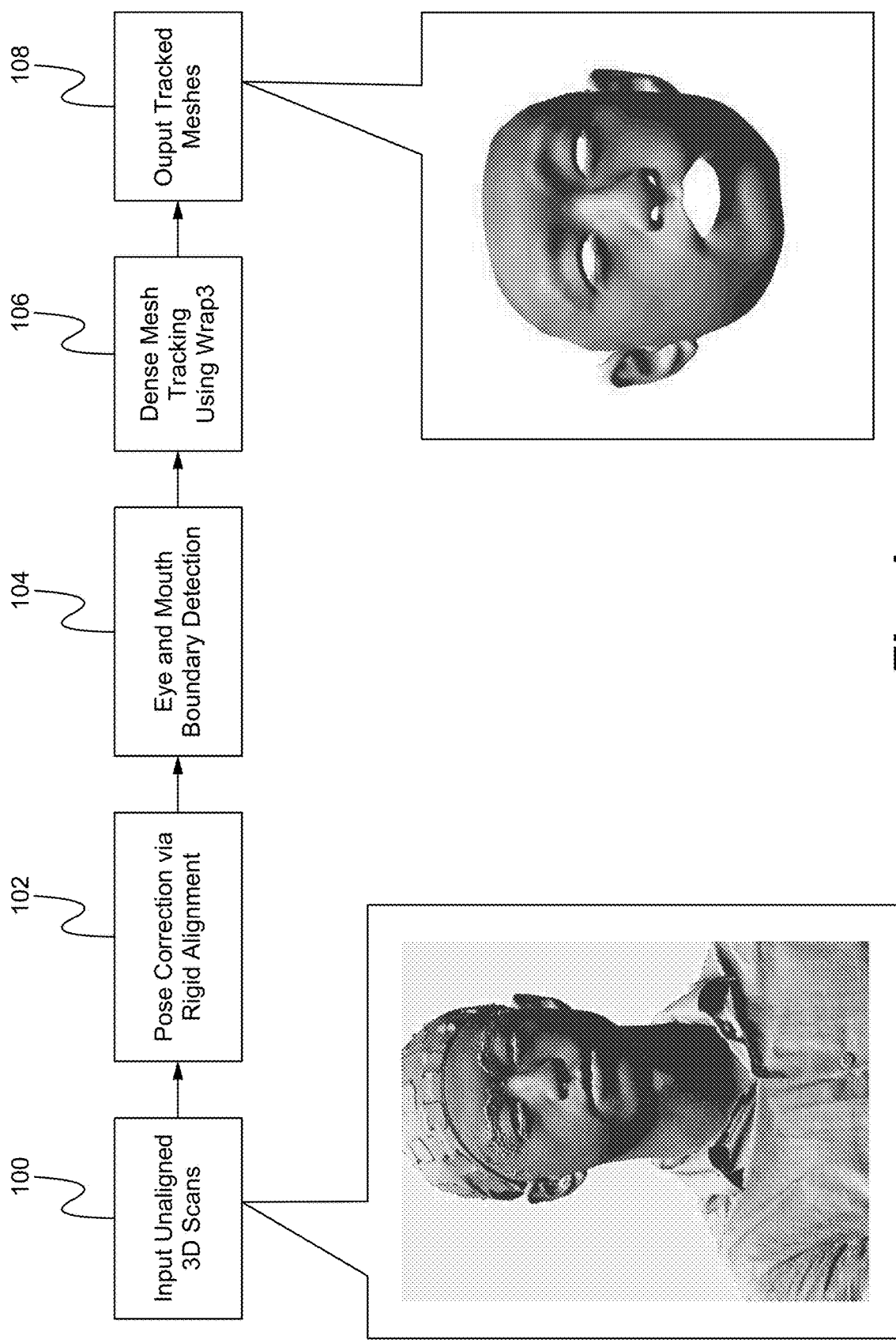
FIG. 1 illustrates a flowchart of a method of implementing automatic mesh tracking for 3D face modeling according to some embodiments.

FIG. 1 illustrates a flowchart of a method of implementing automatic mesh tracking for 3D face modeling according to some embodiments. In the step 100, unaligned 3D scans are input. For example, 3D content is acquired by a camera device (or a set of camera devices). In another example, the 3D content is downloaded. In the step 102, pose correction via rigid alignment is implemented. In the step 104, eye and mouth boundaries are detected. In the step 106, dense mesh tracking is implemented using Wrap3. In the step 108, tracked meshes are output. In some embodiments, fewer or additional steps are implemented. In some embodiments, the order of the steps is modified.

Figure 2:
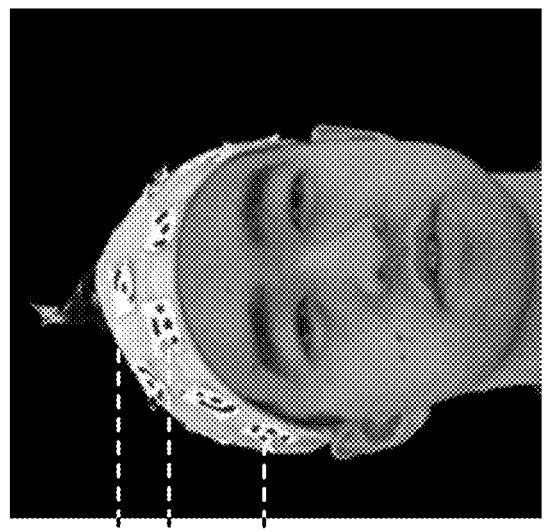
FIG. 2 illustrates a diagram of implementing pose correction via rigid alignment according to some embodiments.
Figure 2:
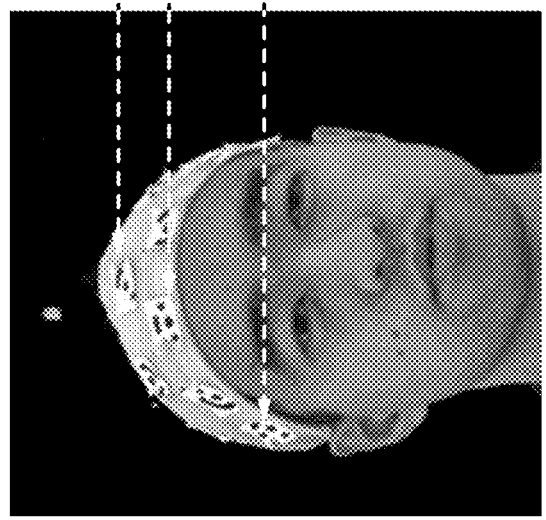

FIG. 2 illustrates a diagram of implementing pose correction via rigid alignment according to some embodiments. Rigid alignment is performed to remove head movement using coded targets. Rigid alignment is able to be performed in any manner such as by aligning specific points on a target with specific points on a reference. For example, the specific points/targets are able to be recognized automatically in any manner such as by detecting a unique object (e.g., by comparing pixels, group of pixels, or region of interest and detecting a specific edge; or by template comparison to detect specific shapes). In another example, using image/video processing, images/frames/meshes are able to be compared by finding matching or similar pixels, points, groups of pixels, regions of interest, superpixels and/or other objects within the images/frames. For example, a target mesh and a reference mesh each have a specific pattern on a user's bandana, and several of the pattern points are selected (and designated as coded targets). The meshes are then able to be aligned using rigid alignment to remove head movement.

Figure 3:
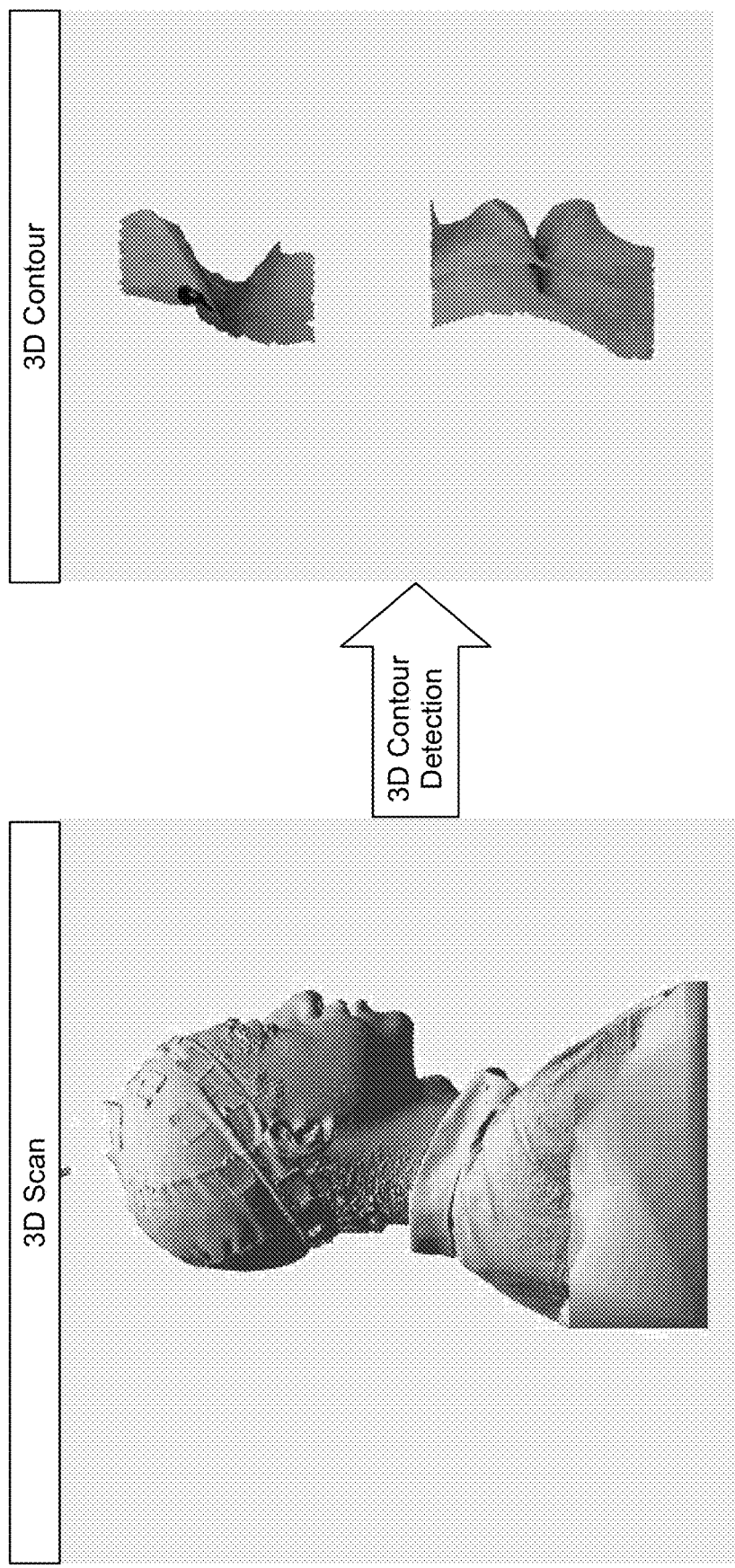
FIG. 3 illustrates a diagram of detecting eye and mouth boundaries according to some embodiments.

FIG. 3 illustrates a diagram of detecting eye and mouth boundaries according to some embodiments. For accurate tracking on the eyes and mouth, 3D contour detection is performed on 3D scans. The detected contours are used in dense mesh tracking. 3D contour detection is able to be implemented in any manner. For example, lines along a surface are able to be analyzed and compared to determine any sharp changes in orientation. In another example, a normal (e.g., cross-product of joined lines) or vector of the direction of an area is able to be determined and classified, and when the classifications indicate that there is a sharp change in orientation (e.g., from up to left), then further analysis is able to be performed to determine if an eye or a mouth is detected. Furthering the example, the detected contours are able to be classified and mapped, and if the contours match a designated feature (e.g., eye, mouth), then it is determined that the feature has been detected. A 3D contour of an eye from a side view is shown as well as a contour of a mouth, where the 3D contour is from a 3D scan. The 3D scans and subsequent contours are able to be from front view or side views (or any other view). In another example, the 3D contour is able to be compared with a template, and if the acquired/determined 3D contour matches with a template, then the 3D contour is able to be classified. For example, a side view of a 3D contour of an eye looks different than a 3D contour of a nose. In some embodiments, a segmentation map is utilized to determine the location of the eyes and mouth.

Figure 4:
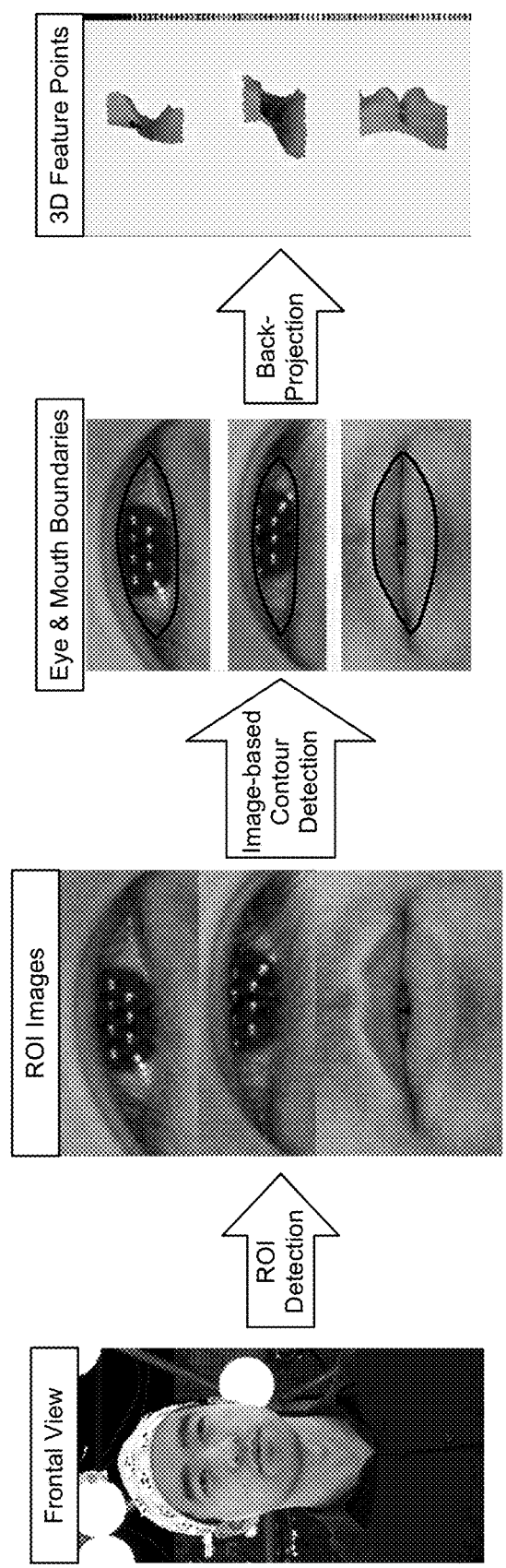
FIG. 4 illustrates a diagram of detecting eye and mouth boundaries according to some embodiments.

FIG. 4 illustrates a diagram of detecting eye and mouth boundaries according to some embodiments. In some embodiments, detecting eye and mouth boundaries includes analyzing a frontal view of a mesh/image/frame to perform Region Of Interest (ROI) detection. ROI detection is able to be implemented in any manner (e.g., using any image processing algorithm such as template matching, edge detection and/or a combination thereof). The ROI images are analyzed using image-based contour detection as described herein which establish eye and mouth boundaries. Using back projection with the eye and mouth boundaries of 2D images, the 3D feature points are able to be established.

Figure 5:
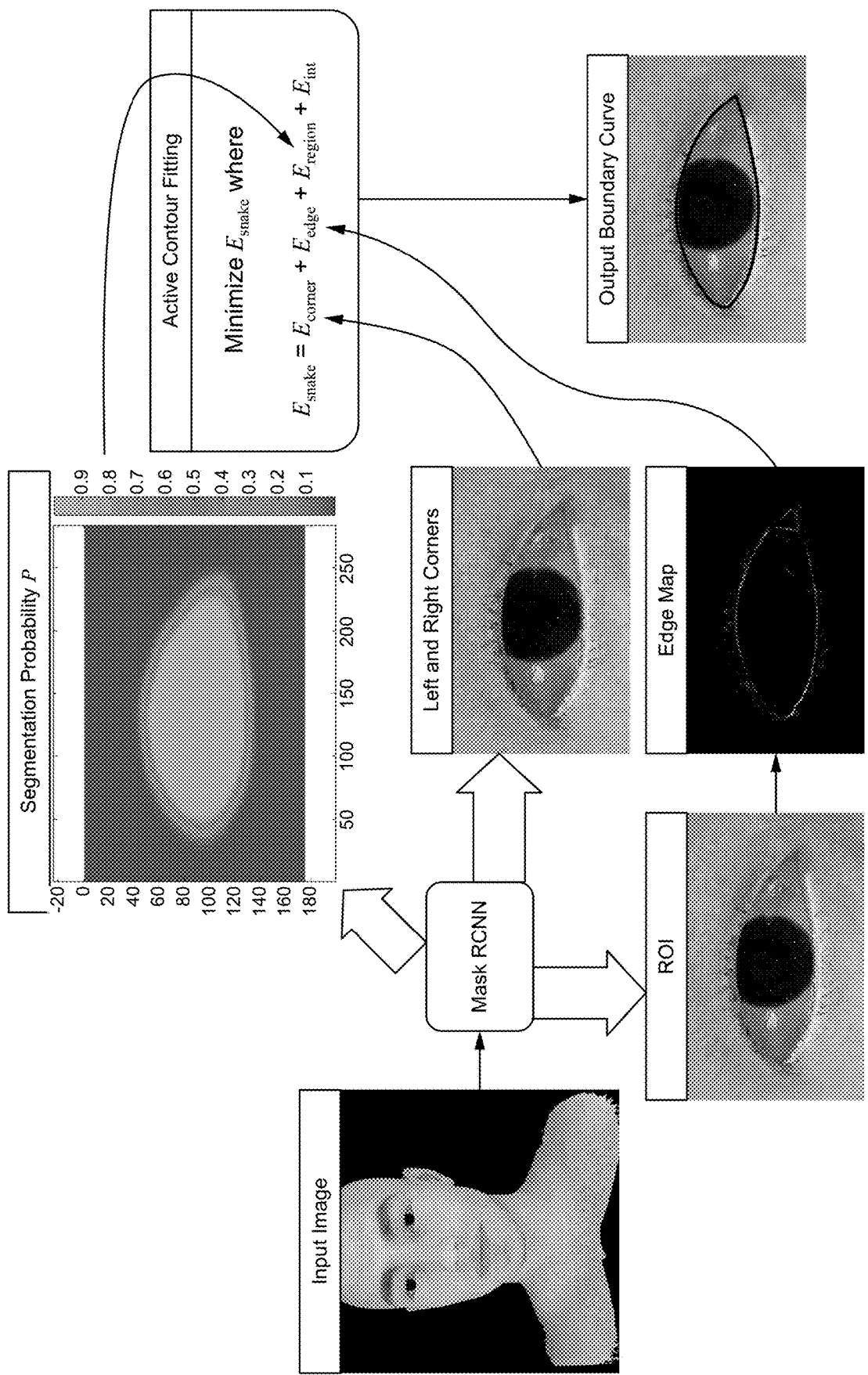
FIG. 5 illustrates a diagram of image-based contour detection according to some embodiments.

FIG. 5 illustrates a diagram of image-based contour detection according to some embodiments. An input image is received, and mask Regional Convolutional Neural Network (RCNN) is applied. Mask RCNN detects objects in an image while simultaneously generating a high quality segmentation mask for each instance. The Mask RCNN results in a segmentation probability P, left and right corners, and an ROI. From the ROI, an edge map is able to be generated. The active contour fitting (snake) algorithm is implemented which receives this data. The snake algorithm involves minimizing $E_{snake}$ where $E_{snake}=E_{corner}+E_{edge}+E_{region}+E_{int}$. A boundary curve is able to be output.

Figure 6:
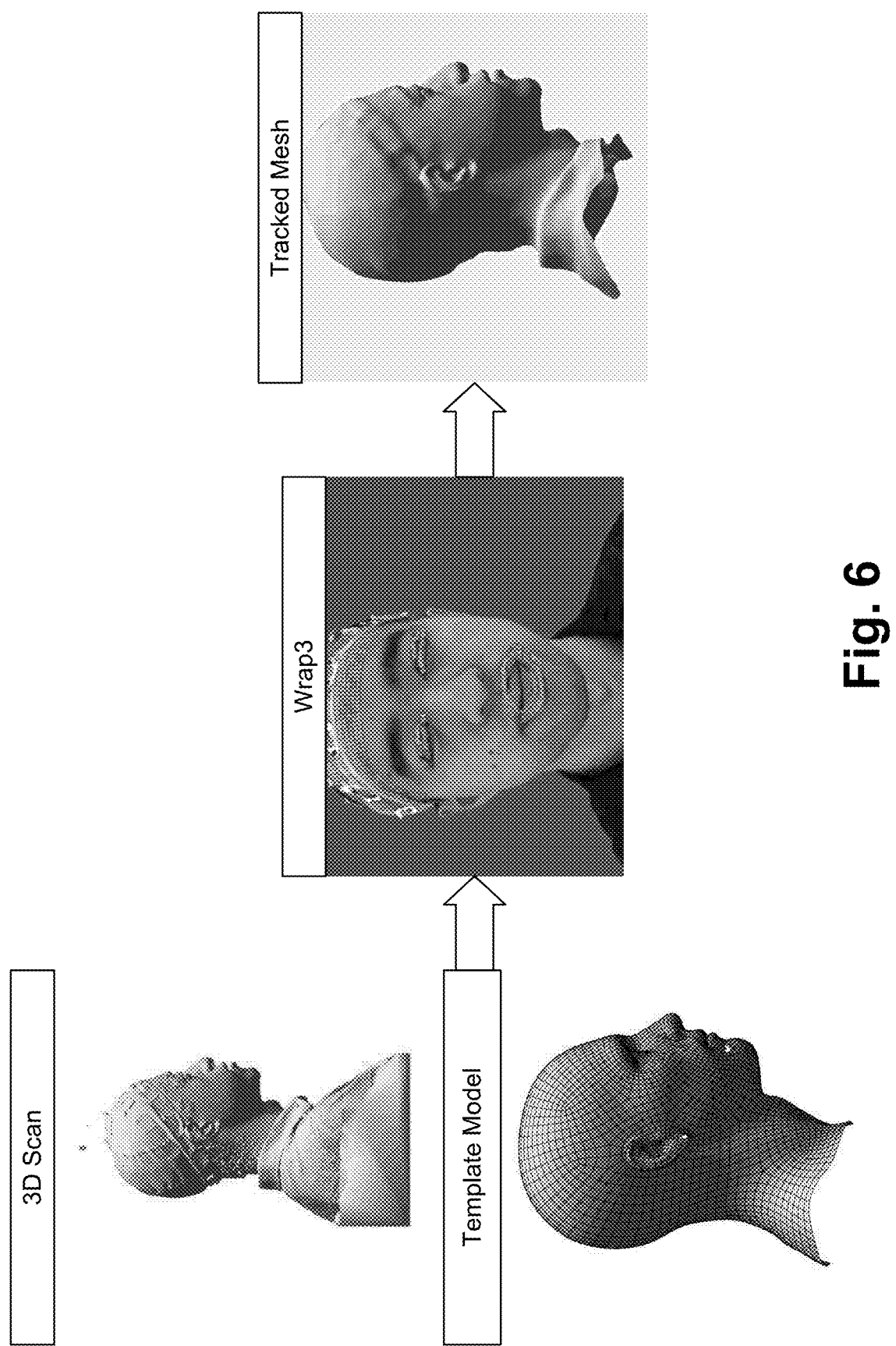
FIG. 6 illustrates a diagram of dense mesh tracking using Wrap3 according to some embodiments.

FIG. 6 illustrates a diagram of dense mesh tracking using Wrap3 according to some embodiments. A 3D scan and a template model are processed by a Wrap3 implementation which outputs a tracked mesh. In some embodiments, an implementation instead of Wrap3 is used.

Figure 7:
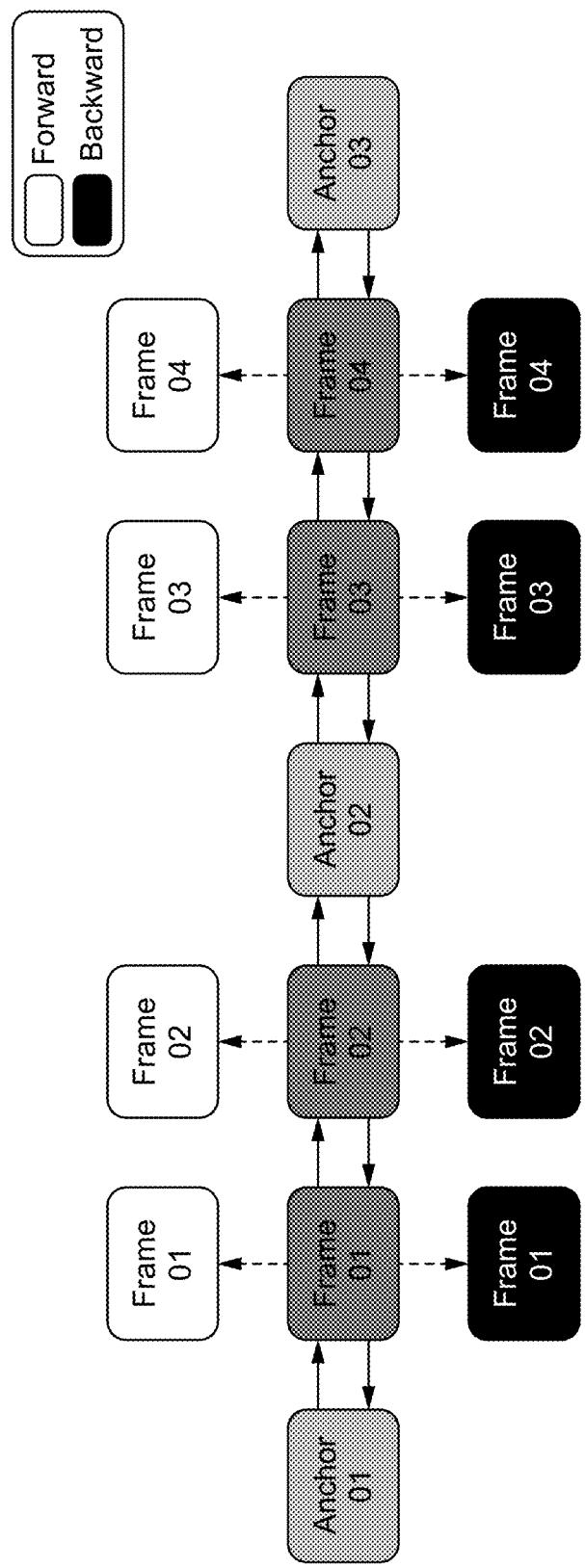
FIG. 7 illustrates a diagram of bidirectional mesh tracking according to some embodiments.

FIG. 7 illustrates a diagram of bidirectional mesh tracking according to some embodiments. To reduce drifting, a video is divided into short clips. Then, forward and backward tracking are performed within each clip, and the forward and backward clips are merged together.

Figure 8:
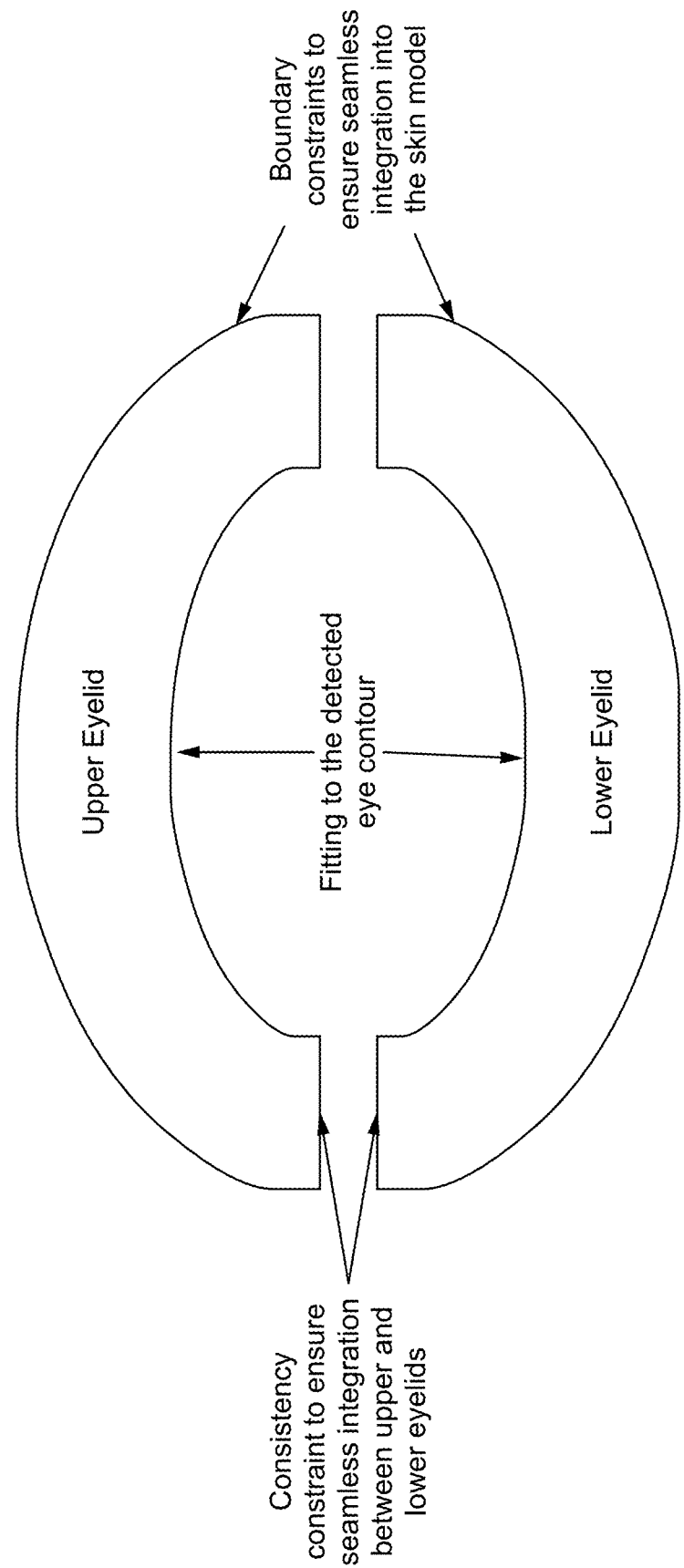
FIG. 8 illustrates a diagram of eyelid correction through mesh deformation according to some embodiments.

FIG. 8 illustrates a diagram of eyelid correction through mesh deformation according to some embodiments. Eyelids are prone to distortions when fitted using Wrap3. A dedicated mesh deformation algorithm to fit eyelid meshes is able to be implemented. The deformation algorithm includes boundary constraints to ensure seamless integration into the skin model. The deformation algorithm also includes a consistency constraint to ensure seamless integration between upper and lower eyelids.

Figure 9:
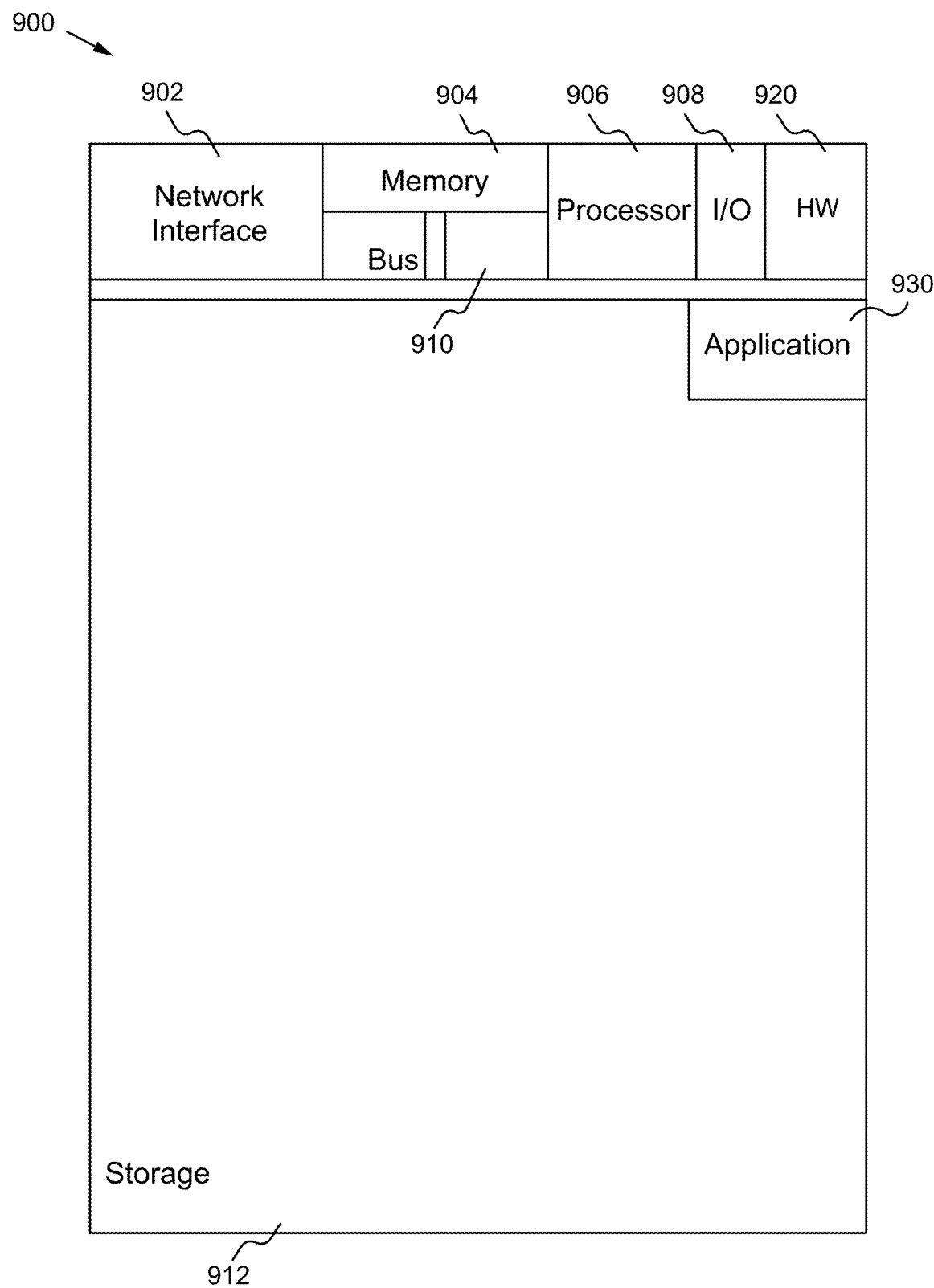
FIG. 9 illustrates a block diagram of an exemplary computing device configured to implement the automatic mesh tracking method according to some embodiments.

FIG. 9 illustrates a block diagram of an exemplary computing device configured to implement the automatic mesh tracking method according to some embodiments. The computing device 900 is able to be used to acquire, store, compute, process, communicate and/or display information such as images and videos including 3D content. The computing device 900 is able to implement any of the automatic mesh tracking aspects. In general, a hardware structure suitable for implementing the computing device 900 includes a network interface 902, a memory 904, a processor 906, I/O device(s) 908, a bus 910 and a storage device 912. The choice of processor is not critical as long as a suitable processor with sufficient speed is chosen. The memory 904 is able to be any conventional computer memory known in the art. The storage device 912 is able to include a hard drive, CDROM, CDRW, DVD, DVDRW, High Definition disc/drive, ultra-HD drive, flash memory card or any other storage device. The computing device 900 is able to include one or more network interfaces 902. An example of a network interface includes a network card connected to an Ethernet or other type of LAN. The I/O device(s) 908 are able to include one or more of the following: keyboard, mouse, monitor, screen, printer, modem, touchscreen, button interface and other devices. Automatic mesh tracking application(s) 930 used to implement the automatic mesh tracking method are likely to be stored in the storage device 912 and memory 904 and processed as applications are typically processed. More or fewer components shown in FIG. 9 are able to be included in the computing device 900. In some embodiments, automatic mesh tracking hardware 920 is included. Although the computing device 900 in FIG. 9 includes applications 930 and hardware 920 for the automatic mesh tracking method, the automatic mesh tracking method is able to be implemented on a computing device in hardware, firmware, software or any combination thereof. For example, in some embodiments, the automatic mesh tracking applications 930 are programmed in a memory and executed using a processor. In another example, in some embodiments, the automatic mesh tracking hardware 920 is programmed hardware logic including gates specifically designed to implement the automatic mesh tracking method.

In some embodiments, the automatic mesh tracking application(s) 930 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the automatic mesh tracking method, a device acquires or receives 3D content and processes the content to provide better 3D content. The automatic mesh tracking method is able to be implemented with user assistance or automatically without user involvement.

In operation, the automatic mesh tracking method enables more accurate automatic mesh tracking for 3D face modeling compared to previous implementations.

Some Embodiments of Automatic Mesh Tracking for 3D Face Modeling

1. A method programmed in a non-transitory memory of a device comprising:
    inputting unaligned 3D scans;
    implementing pose correction via rigid alignment on the unaligned 3D scans to generate aligned meshes;
    detecting eye and mouth boundaries on the aligned meshes;
    implementing dense mesh tracking on the aligned meshes; and
    outputting a tracked mesh based on the dense mesh tracking.
2. The method of clause 1 wherein implementing dense mesh tracking utilizes Wrap3.
3. The method of clause 1 wherein rigid alignment is performed to remove head movement using coded targets.
4. The method of clause 1 wherein detecting eye and mouth boundaries includes 3D contour detection.
5. The method of clause 4 wherein 3D detecting eye and mouth boundaries includes analyzing a view of a mesh to perform Region Of Interest (ROI) detection.
6. The method of clause 4 wherein 3D contour detection includes:
    applying mask Regional Convolutional Neural Network (RCNN) which results in a segmentation probability, left and right corners, and a region of interest;
    generating an edge map from the region of interest; and
    using an improved active contour fitting snake algorithm.
7. The method of clause 6 wherein the snake algorithm involves minimizing $E_{snake}$ where $E_{snake}=E_{corner}+E_{edge}+E_{region}+E_{int}$.
8. The method of clause 1 wherein implementing dense mesh tracking includes dividing a video into short clips to reduce drifting, performing forward and backward tracking within each clip, and merging the forward and backward clips together.
9. The method of clause 1 further comprising eyelid correction through mesh deformation.
10. An apparatus comprising:
    a non-transitory memory for storing an application, the application for:
        inputting unaligned 3D scans;
        implementing pose correction via rigid alignment on the unaligned 3D scans to generate aligned meshes;
        detecting eye and mouth boundaries on the aligned meshes;
        implementing dense mesh tracking on the aligned meshes; and
        outputting a tracked mesh based on the dense mesh tracking; and
    a processor coupled to the memory, the processor configured for processing the application.
11. The apparatus of clause 10 wherein implementing dense mesh tracking utilizes Wrap3.
12. The apparatus of clause 10 wherein rigid alignment is performed to remove head movement using coded targets.
13. The apparatus of clause 10 wherein detecting eye and mouth boundaries includes 3D contour detection.
14. The apparatus of clause 13 wherein 3D detecting eye and mouth boundaries includes analyzing a view of a mesh to perform Region Of Interest (ROI) detection.

15. The apparatus of clause 13 wherein 3D contour detection includes:
   applying mask Regional Convolutional Neural Network (RCNN) which results in a segmentation probability, left and right corners, and a region of interest;
   generating an edge map from the region of interest; and
   using an improved active contour fitting snake algorithm.
16. The apparatus of clause 15 wherein the snake algorithm involves minimizing $E_{snake}$ where $E_{snake}=E_{corner}+E_{edge}+E_{region}+E_{int}$.
17. The apparatus of clause 10 wherein implementing dense mesh tracking includes dividing a video into short clips to reduce drifting, performing forward and backward tracking within each clip, and merging the forward and backward clips together.
18. The apparatus of clause 10 further comprising eyelid correction through mesh deformation.
19. A system comprising:
   one or more cameras for acquiring three dimensional content; and
   a device for processing the three dimensional content by:
      receiving three dimensional content including unaligned 3D scans;
      implementing pose correction via rigid alignment on the aligned 3D scans to generate aligned meshes;
      detecting eye and mouth boundaries on the aligned meshes;
      implementing dense mesh tracking on the aligned meshes; and
      outputting a tracked mesh based on the dense mesh tracking.
20. The system of clause 19 wherein implementing dense mesh tracking utilizes Wrap3.
21. The system of clause 19 wherein rigid alignment is performed to remove head movement using coded targets.
22. The system of clause 19 wherein detecting eye and mouth boundaries includes 3D contour detection.
23. The system of clause 22 wherein 3D detecting eye and mouth boundaries includes analyzing a view of a mesh to perform Region Of Interest (ROI) detection.
24. The system of clause 22 wherein 3D contour detection includes:
   applying mask Regional Convolutional Neural Network (RCNN) which results in a segmentation probability, left and right corners, and a region of interest;
   generating an edge map from the region of interest; and
   using an improved active contour fitting snake algorithm.
25. The system of clause 24 wherein the snake algorithm involves minimizing $E_{snake}$ where $E_{snake}=E_{corner}+E_{edge}+E_{region}+E_{int}$.
26. The system of clause 22 wherein implementing dense mesh tracking includes dividing a video into short clips to reduce drifting, performing forward and backward tracking within each clip, and merging the forward and backward clips together.
27. The system of clause 22 further comprising eyelid correction through mesh deformation.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   inputting unaligned 3D scans;
   implementing pose correction via rigid alignment on the unaligned 3D scans to generate aligned meshes;
   detecting eye and mouth boundaries on the aligned meshes;
   implementing mesh tracking on the aligned meshes; and
   outputting a tracked mesh based on the mesh tracking,
   wherein detecting the eye and mouth boundaries includes 3D contour detection, wherein the 3D contour detection includes:
   applying a mask Regional Convolutional Neural Network (RCNN) which results in a segmentation probability, left and right corners, and a region of interest;
   generating an edge map from the region of interest; and
   using an improved active contour fitting snake algorithm.
2. The method of claim 1 wherein implementing the mesh tracking utilizes Wrap3.
3. The method of claim 1
   wherein the rigid alignment is performed to remove head movement using coded targets.
4. The method of claim 1
   wherein detecting the eye and mouth boundaries includes analyzing a view of a mesh to perform Region Of Interest (ROI) detection.
5. The method of claim 1 wherein the snake algorithm involves minimizing $E_{snake}$ where $E_{snake}=E_{corner}+E_{edge}+E_{region}+E_{int}$.
6. The method of claim 1 wherein implementing the mesh tracking includes
   dividing a video into short clips to reduce drifting,
   performing forward and backward tracking within each clip, and
   merging the forward and backward clips together.
7. The method of claim 1 further comprising eyelid correction through mesh deformation.
8. An apparatus comprising:
   a non-transitory memory for storing an application, the application for:
   inputting unaligned 3D scans;
   implementing pose correction via rigid alignment on the unaligned 3D scans to generate aligned meshes;
   detecting eye and mouth boundaries on the aligned meshes;
   implementing mesh tracking on the aligned meshes; and
   outputting a tracked mesh based on the mesh tracking;
   wherein detecting the eye and mouth boundaries includes 3D contour detection, wherein the 3D contour detection includes:
   applying a mask Regional Convolutional Neural Network (RCNN) which results in a segmentation probability, left and right corners, and a region of interest;
   generating an edge map from the region of interest; and
   using an improved active contour fitting snake algorithm
   a processor coupled to the memory, the processor configured for processing the application.
9. The apparatus of claim 8
   wherein implementing the mesh tracking utilizes Wrap3.
10. The apparatus of claim 8
   wherein the rigid alignment is performed to remove head movement using coded targets.
11. The apparatus of claim 8
   wherein detecting the eye and mouth boundaries includes analyzing a view of a mesh to perform Region Of Interest (ROI) detection.

12. The apparatus of claim 8 wherein the snake algorithm involves minimizing $E_{snake}$ where $E_{snake}=E_{corner}+E_{edge}+E_{region}+E_{int}$.

13. The apparatus of claim 8
wherein implementing the mesh tracking includes dividing a video into short clips to reduce drifting, performing forward and backward tracking within each clip, and
merging the forward and backward clips together.

14. The apparatus of claim 8 further comprising eyelid correction through mesh deformation.

15. A system comprising:
one or more cameras for acquiring three dimensional content; and
a device for processing the three dimensional content by:
receiving three dimensional content including unaligned 3D scans;
implementing pose correction via rigid alignment on the unaligned 3D scans to generate aligned meshes;
detecting eye and mouth boundaries on the aligned meshes;
implementing mesh tracking on the aligned meshes; and
outputting a tracked mesh based on the mesh tracking,
wherein detecting the eye and mouth boundaries includes 3D contour detection, wherein the 3D contour detection includes:
applying a mask Regional Convolutional Neural Network (RCNN) which results in a segmentation probability, left and right corners, and a region of interest;
generating an edge map from the region of interest; and
using an improved active contour fitting snake algorithm.

16. The system of claim 15
wherein implementing the mesh tracking utilizes Wrap3.

17. The system of claim 15
wherein the rigid alignment is performed to remove head movement using coded targets.

18. The system of claim 15
wherein detecting the eye and mouth boundaries includes analyzing a view of a mesh to perform Region Of Interest (ROI) detection.

19. The system of claim 15 wherein the snake algorithm involves minimizing $E_{snake}$ where $E_{snake}=E_{corner}+E_{edge}+E_{region}+E_{int}$.

20. The system of claim 15
wherein implementing the mesh tracking includes dividing a video into short clips to reduce drifting, performing forward and backward tracking within each clip, and merging the forward and backward clips together.

21. The system of claim 15 further comprising eyelid correction through mesh deformation.

22. A method programmed in a non-transitory memory of a device comprising:
inputting unaligned 3D scans;
implementing pose correction via rigid alignment on the unaligned 3D scans to generate aligned meshes;
detecting eye and mouth boundaries on the aligned meshes;
implementing mesh tracking on the aligned meshes, wherein implementing the mesh tracking includes dividing a video into short clips to reduce drifting, performing forward and backward tracking within each clip, and merging the forward and backward clips together; and
outputting a tracked mesh based on the mesh tracking.

23. The method of claim 22 wherein implementing the mesh tracking utilizes Wrap3.

24. The method of claim 22 wherein the rigid alignment is performed to remove head movement using coded targets.

25. The method of claim 22 wherein detecting the eye and mouth boundaries includes 3D contour detection.

26. The method of claim 25 wherein detecting the eye and mouth boundaries includes analyzing a view of a mesh to perform Region Of Interest (ROI) detection.

27. The method of claim 22 further comprising eyelid correction through mesh deformation.

28. An apparatus comprising: a non-transitory memory for storing an application, the application for:
inputting unaligned 3D scans;
implementing pose correction via rigid alignment on the unaligned 3D scans to generate aligned meshes;
detecting eye and mouth boundaries on the aligned meshes;
implementing mesh tracking on the aligned meshes, wherein implementing the mesh tracking includes dividing a video into short clips to reduce drifting, performing forward and backward tracking within each clip, and merging the forward and backward clips together; and
outputting a tracked mesh based on the mesh tracking; and
a processor coupled to the memory, the processor configured for processing the application.

29. The apparatus of claim 28 wherein implementing the mesh tracking utilizes Wrap3.

30. The apparatus of claim 28 wherein the rigid alignment is performed to remove head movement using coded targets.

31. The apparatus of claim 28 wherein detecting the eye and mouth boundaries includes 3D contour detection.

32. The apparatus of claim 31 wherein detecting the eye and mouth boundaries includes analyzing a view of a mesh to perform Region Of Interest (ROI) detection.

33. The apparatus of claim 28 further comprising eyelid correction through mesh deformation.

34. A system comprising:
one or more cameras for acquiring three dimensional content; and
a device for processing the three dimensional content by:
receiving three dimensional content including unaligned 3D scans;
implementing pose correction via rigid alignment on the unaligned 3D scans to generate aligned meshes;
detecting eye and mouth boundaries on the aligned meshes;
implementing mesh tracking on the aligned meshes, wherein implementing the mesh tracking includes dividing a video into short clips to reduce drifting, performing forward and backward tracking within each clip, and merging the forward and backward clips together; and
outputting a tracked mesh based on the mesh tracking.

35. The system of claim 34 wherein implementing the mesh tracking utilizes Wrap3.

36. The system of claim 34 wherein the rigid alignment is performed to remove head movement using coded targets.

37. The system of claim 34 wherein detecting the eye and mouth boundaries includes 3D contour detection.

38. The system of claim 37 wherein detecting the eye and mouth boundaries includes analyzing a view of a mesh to perform Region Of Interest (ROI) detection.

39. The system of claim 34 further comprising eyelid correction through mesh deformation.

* * * * *